United States Patent [19]
De Caluwe et al.

[11] Patent Number: 5,524,778
[45] Date of Patent: Jun. 11, 1996

[54] LABELLED CONTAINER INCORPORATING RECYCLED PLASTIC

[75] Inventors: Robert C. De Caluwe, Londerzeel; Joseph F. Deflander, Wespelaar, both of Belgium

[73] Assignee: The Procter & Gamble Company, Cincinnati, Ohio

[21] Appl. No.: 295,891
[22] PCT Filed: Mar. 8, 1993
[86] PCT No.: PCT/US93/01953
§ 371 Date: Oct. 31, 1994
§ 102(e) Date: Oct. 31, 1994
[87] PCT Pub. No.: WO93/17919
PCT Pub. Date: Sep. 16, 1993
[51] Int. Cl.$^6$ ..................................................... B65D 1/02
[52] U.S. Cl. .................................... 215/12.2; 40/310
[58] Field of Search ........................... 215/12.2; 40/310

[56] References Cited

U.S. PATENT DOCUMENTS

| | | | |
|---|---|---|---|
| 3,604,584 | 9/1971 | Shank, Jr. | 40/310 |
| 4,079,850 | 3/1978 | Suzuki et al. | 215/12.2 |
| 4,190,168 | 2/1980 | Jacques | 215/12.2 |
| 4,567,681 | 2/1986 | Fumei | 40/310 |
| 4,612,721 | 9/1986 | Fumei | 40/310 |
| 4,662,528 | 5/1987 | Slat | 215/12.2 |
| 4,943,458 | 7/1990 | Buecheler | 215/12.2 |
| 5,079,057 | 1/1992 | Heider | 215/386 |
| 5,108,805 | 4/1992 | Gerard | 215/12.2 |

*Primary Examiner*—Stephen P. Garbe
*Attorney, Agent, or Firm*—Ronald W. Kock

[57] ABSTRACT

A container of thermoplastic material having a label which substantially covers the visible outer surface of the body of the container. The container is made either as a single layer or multi-layer extrusion. The layer of the container which is visible from the outside is made from 10% to 100% recycled plastic. The label is made of substantially the same material as the container so that both may be recycled without removing the label.

7 Claims, 1 Drawing Sheet

LABELLED CONTAINER INCORPORATING RECYCLED PLASTIC

BACKGROUND OF THE INVENTION

Recently there has been increasing tendency in the consumer goods industries to make packaging out of recycled plastics, mainly for environmental reasons.

There are disadvantages to using plastic containers, bottles etc., with recycled plastics as a constituent material of the outside layer of a container. The main disadvantage is that the recycled plastic causes the outer surface of the container to be dark in colour due to the presence of impurities, including different polymers and pigments in the recycled plastic.

Previous solutions to this problem have included the co-extrusion of a multi-layered container so that the outer surface is made from a plastic layer containing no recycled plastic. This means that the coloured recycled plastic can be shielded from view by the outer layer of non-recycled plastic. However the co-extrusion technique is complicated and expensive. Furthermore, the proportion of recycled plastic that can be used in the container is limited.

Alternatively, a container made from recycled plastic, and including recycled plastic in its outer surface layer can be made to have a coloured appearance. Pigments are added to the plastic/recycled plastic to give it a consistent coloured appearance which is not dependent on the colour of the recycled plastic. However, there are limitations on the surface characteristics and colour that can be given to the container.

U.S. Pat. No. 4,661,187, dated Apr. 18, 1987, describes a means for attaching a label to a container using a viscous, tacky solution to attach the label and then wrap it around the bottle. The solution hardens and weakens so that later the label can be easily stripped from the container for recycling. However it would be more economical if there was no need to strip the label from the bottle before recycling.

WO 88/05752, published Aug. 11, 1988, describes a packaging wrap/label for enclosing and protecting various containers. The wrap is made of heat shrinkable plastic made at least in part of a styrene-butadiene block copolymer. This document does not deal with the problems of containers made at least in part from recycled plastic materials.

There is a need, however, to present a container to the consumer, made partly or wholly from recycled plastic which cannot be distinguished by function or appearance from a container made entirely from non-recycled plastic.

The purpose of this invention is to provide an economical and practical container made at least in part from recycled plastic and which is not limited by the surface properties of the recycled plastic in the outer layer. This has been achieved by substantially covering the outer surface of the container with a label which is opaque over most (or all) of its area.

Another purpose of the present invention is to provide a container and label that can easily be recycled again after use. In a preferred embodiment of the invention, the label is made from plastic materials that means that it does not have to be removed from the container before recycling.

SUMMARY OF THE INVENTION

A container of thermoplastic material having a label which substantially covers the visible outer surface of the body of the container. The container is made either as a single layer or multi-layer extrusion. The layer of the container which is visible from the outside is made from 10% to 100% recycled plastic which comprises polyethylene and/or polyester and further comprises polypropylene which is present as an impurity.

DETAILED DESCRIPTION OF THE INVENTION

The invention consists of making a container from recycled plastic, or a blend of recycled and non-recycled plastic, and substantially covering the outside surface of the body of that container with a label which is opaque over most, or all, of its area. The label may carry features which identify the contents and/or the brand name of the containers contents and also carry other information including instructions for use.

RECYCLED PLASTIC

Although it may be theoretically possible to collect and clean plastic containers for recycling, and segregate them into unique groups according to material and colour, this is rarely economical. In practical terms, the recycling of polyethylene or polyester containers will result in a material of mixed plastics (including polypropylene) and other impurities. Included in these impurities will normally be pigments which give a non-white appearance to the recycled plastic. In this application polyester is taken to include polyethylene terephthalate, polyethylene terephthalate with glycol additive and PETex.

This invention relates to recycled plastics consisting of at least 50% polyethylene or polyester and from 2% to 20% polypropylene, preferably from 5% to 10% polypropylene, together with other impurities. Such recycled plastics can be distinguished from non-recycled polyethylene raw material by various parameters including density, melt flow index, infrared techniques, differential scanning colorimetry as well as colour and odour. Especially important is differential scanning colorimetry which can determine the presence of polypropylene in a recycled plastic.

In a preferred embodiment the recycled plastic consists of at least 85% polyethylene.

The plastic containers collected for recycling should be cleaned and processed by any of the methods that will be familiar to a man skilled in the art.

THE CONTAINER

The present invention encompasses containers blown as a single layer extrusion from the recycled plastic material, or from a blend of the recycled material with non-recycled material, the blend containing from 10% to 100% by weight of recycled plastic.

The present invention further encompasses containers blown by multi-layer co-extrusion techniques in which the outer layer of the container is a blend as defined above containing from 10% to 100% recycled material. In an alternative embodiment of the invention, the container is made by multi-layer co-extrusion whereby the inner layer (in contact with the contents of the container) is made of 100% non-recycled plastic.

Colouring of the plastic may be achieved by using pigments or masterbatch. However it is a feature of the invention that this is not necessary.

LABEL

The label may be made either from thermoplastic material or paper.

In a preferred embodiment the label is made of a thermoplastic material. Suitable plastics include polyvinyl chloride, polyethylene, polyester including polyethylene terephthalate and polyethylene terephthalate with glycol additive, polypropylene or oriented polypropylene, polystyrene or oriented polystyrene.

The label may be made either from a single film of plastic, or laminated in two or more layers.

The plastic may be glass clear transparent glossy film which will be printed upon, or, alternatively, at least one layer of the film may be pigmented by the addition of dyes or pigments before or at the film extrusion step.

The colours (including white) may be obtained by printing on to the label by any conventional printing technique, in particular flexo and gravure printing are known to be suitable. A preferred method, known as reverse printing, is to print the colours/dyes on the inside of the label in order to maintain its glossiness.

In a preferred embodiment of the invention the density of the dyes should be such that the label is sufficiently opaque to mask the coloured appearance of the recycled plastic in the outer surface of the container.

MANUFACTURE

The label may be attached to the bottle by any conventional method.

A preferred way of attaching the label is by heat shrinking. The label is seamed in order to form a tube which can be cut to length and placed over the container. The container and label are then passed through a shrink tunnel in which hot air is blown onto the label sleeve causing it to shrink and take the shape and contours of the bottle.

An alternative way of attaching the label is by stretch wrapping. Suitable labels may be made from polyethylene which is seamed and formed into tubes. The tube is then stretched, placed over the container and then allowed to contract and take the external contours of the container.

Still another alternative method is to wrap the label around the container and secure it by any conventional means, including solvents or hot melt or using self adhesive labels.

THIN WALLED CONTAINERS

In a particular embodiment of the present invention the label is applied to a container having a body wall thickness not greater than 0.3 mm. Such containers are generally considered to be not suitable for silk screen printing and are therefore well-suited to the sleeve-type label described above. This combination of a thin-walled, light-weight container based on recycled materials together with the label emphasises the environmental benefits arising from the invention.

FURTHER RECYCLING OF THE CONTAINER

After use the container may be recovered and recycled again. Normally it is not necessary to remove the label before recycling. The container and label may be prepared for recycling as described above giving a mixed thermoplastic material containing impurities including the pigments which were present on the label.

Some of the impurities may be separated out from the rest of the recycled plastic. For example, polyvinyl chloride, polyethylene terephthalate and polystyrene may be separated from polyethylene by density differences of ground flakes. Any suitable equipment including hydrocyclone and airlifts may be used. NRT can be used to separate polyvinyl chloride from other thermoplastics, magnets can be used to separate metallic components, and filters to separate solid particles from molten thermoplastics.

In a particularly preferred embodiment of the invention the label is made from a thermoplastic material which is substantially the same as the container material. In this case the steps to refine the recycled plastic from the containers/labels before extruding into new (recycled) containers may be largely unnecessary.

EXAMPLE

Figure 1A:
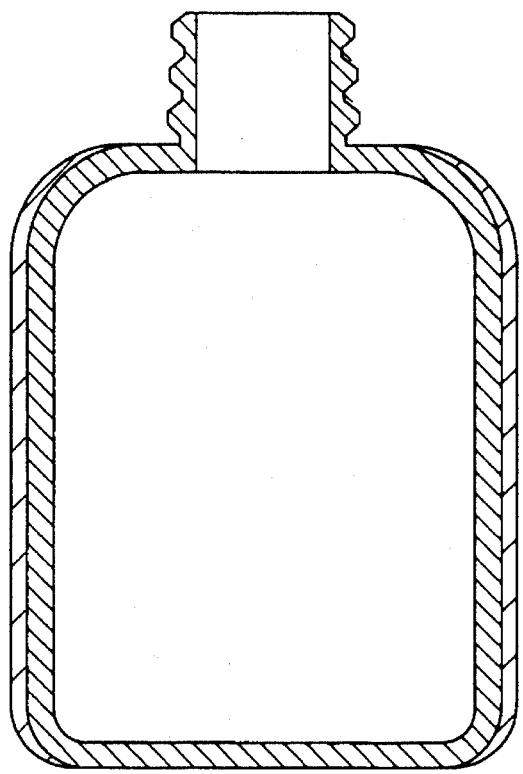
FIG. 1a shows a cross section of a bottle extruded in two layers.
Figure 1B:
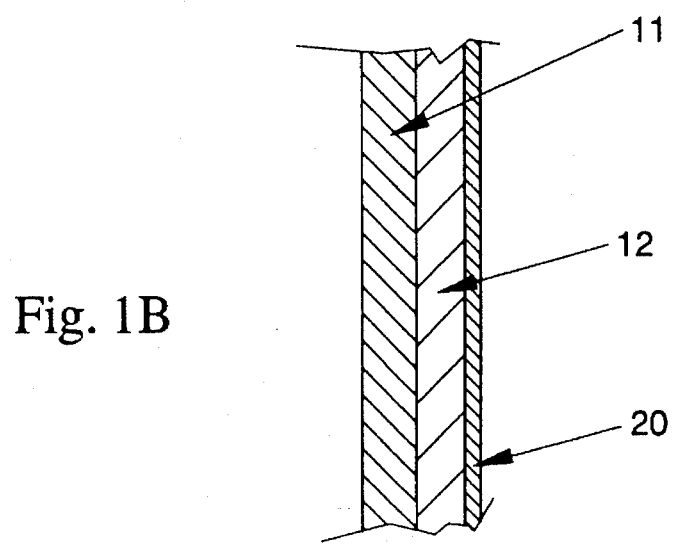
FIG. 1b is a portion thereof, disclosing an inner layer (11) and an outer layer (12), covered by a label (20).

A container in the form of a bottle is approximately cylindrical in shape, with a tapered shoulder and a pouring hole of 24 mm at the top. The dimensions of the bottle are 270 mm high and 65 mm in diameter. The bottle is from a blend of recycled and non-recycled plastic in the ratio 3:7. The recycled material typically containing about 92% high density polyethylene, 5% polypropylene and 3% other impurities. The bottle is blown by single layer extrusion and has a green or blue colour.

The label is made out of glass clear transparent glossy polypropylene film which has a thickness of 55 mm. The inside of the label is printed with 7 colours (including 2 times white in order to obtain sufficient opacity). The polypropylene film is then seamed to form a tube which is delivered to the packing line on reels for automatic application.

Filled bottles are conveyed on a conveyor belt, the sleeves are cut to length and positioned over the bottles so as to cover the body of the bottles.

The bottles then pass through a shrink tunnel in which hot air is blown on to the sleeve causing thermal shrinkage. The temperature in the first part of the shrink tunnel is 180° C., and in the second part of the tunnel is 240° C. This shrinkage continues until the sleeves have taken the shape and contours of the bottle. At the end of the tunnel two hot air blowers ensure that the top part of the sleeve is properly shrunk over the tapered shoulder.

We claim:

1. A labelled container containing recycled plastic, said container comprising:
   a) a container made of a thermoplastic material, said container having an outer surface and containing 10% to 100% by weight of recycled plastic, said recycled plastic having an unattractive color; and
   b) an opaque thermoplastic label covering substantially all of said outer surface of said container, in order to hide said unattractive color at said outer surface from view, said opaque label being made of substantially the same thermoplastic as said container so that said container and label may be recycled together without having to first remove said label.

2. A labelled container containing recycled plastic comprising:
   a) a container made of a multi-layer thermoplastic material, said container having an inner layer of 100% non-recycled plastic and an outer layer containing 10% to 100% by weight of recycled plastic, said recycled plastic having an unattractive color; and
   b) an opaque thermoplastic label stretch wrapped to said outer layer of said container, in order to hide said unattractive color of said outer layer from view, said label being made of substantially the same thermoplastic as said container so that said container and label may be recycled without having to first remove said label.

3. The labelled container of claim 2 wherein said recycled plastic contains at least 50% polyethylene and from 2% to 20% polypropylene.

4. The labelled container of claim 2 wherein said recycled plastic contains at least 50% polyester and from 2% to 20% polypropylene.

5. A labelled container containing recycled plastic comprising:
   a) a container made of a multi-layer thermoplastic material, said container having an inner layer of 100% non-recycled plastic and an outer layer containing 10% to 100% by weight of recycled plastic, said recycled plastic having an unattractive color; and
   b) an opaque thermoplastic label heat shrunk to said outer layer of said container, in order to hide said unattractive color of said outer layer from view, said label being made of substantially the same thermoplastic as said container so that said container and label may be recycled without having to first remove said label.

6. The labelled container of claim 5 wherein said recycled plastic contains at least 50% polyethylene and from 2% to 20% polypropylene.

7. The labelled container of claim 5 wherein said recycled plastic contains at least 50% polyester and from 2% to 20% polypropylene.

* * * * *